US012299992B2

(12) United States Patent
Tanaka et al.

(10) Patent No.: US 12,299,992 B2
(45) Date of Patent: *May 13, 2025

(54) INFORMATION ACQUISITION SUPPORT APPARATUS, INFORMATION ACQUISITION SUPPORT METHOD, AND RECORDING MEDIUM STORING INFORMATION ACQUISITION SUPPORT PROGRAM

(71) Applicant: NEC Corporation, Tokyo (JP)

(72) Inventors: Masaya Tanaka, Tokyo (JP); Masako Wada, Tokyo (JP); Masayuki Ogawa, Tokyo (JP); Muneaki Onozato, Tokyo (JP); Takamichi Yamazaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,622

(22) Filed: Aug. 29, 2023

(65) Prior Publication Data

US 2023/0410516 A1 Dec. 21, 2023

Related U.S. Application Data

(63) Continuation of application No. 17/548,875, filed on Dec. 13, 2021, now Pat. No. 12,159,461.

(30) Foreign Application Priority Data

Dec. 25, 2020 (JP) ................. 2020-216117

(51) Int. Cl.
G06F 21/50 (2013.01)
G06F 40/289 (2020.01)
(Continued)

(52) U.S. Cl.
CPC ............ *G06V 20/52* (2022.01); *G06F 40/289* (2020.01); *G06N 5/022* (2013.01); *G10L 15/26* (2013.01)

(58) Field of Classification Search
USPC ............ 382/100–123, 133–229; 704/1–275; 706/1–62, 900–903
See application file for complete search history.

(56) References Cited

U.S. PATENT DOCUMENTS 6,084,510 A * 7/2000 Lemelson .............. G08G 1/164
382/104
11,741,556 B2 8/2023 Morris et al.
(Continued)

FOREIGN PATENT DOCUMENTS

CN 111199623 A 5/2020
JP H11-345385 A 12/1999
(Continued)

OTHER PUBLICATIONS

Yun Jong Sik; Emergency Shunting Incitement Method of Automatically Transforming Escape Direction According to Fire Located, and System of the Same; 2017 (Year: 2017).*

(Continued)

Primary Examiner — Marcellus J Augustin
(74) Attorney, Agent, or Firm — Sughrue Mion, PLLC

(57) ABSTRACT

An information acquisition support apparatus includes: an acquisition unit that acquires a plurality of notifications related to an event; an analysis unit that analyzes the plurality of notifications on the basis of an analysis criterion; and an event state generation unit that generates event state information obtained by integrating information indicated by the plurality of notifications on the basis of an analysis result of the plurality of notifications and an information integration criterion, and thereby, the information acquisition support apparatus supports rapid and accurate grasping of a state of a site where an event is occurring.

17 Claims, 5 Drawing Sheets

(51) Int. Cl.
  *G06N 5/022*   (2023.01)
  *G06N 20/00*   (2019.01)
  *G06V 20/52*   (2022.01)
  *G10L 15/26*   (2006.01)
  *H04W 4/02*    (2018.01)
  *H04W 4/38*    (2018.01)
  *H04W 68/00*   (2009.01)

(56)           References Cited

U.S. PATENT DOCUMENTS

| | | |
|---|---|---|
| 2011/0302657 A1 | 12/2011 | Ikegami et al. |
| 2013/0222133 A1 | 8/2013 | Schultz et al. |
| 2018/0160910 A1 | 6/2018 | Takahashi et al. |
| 2019/0156650 A1 | 5/2019 | Takagi |
| 2020/0057953 A1 | 2/2020 | Livny et al. |
| 2020/0057985 A1 | 2/2020 | Bryan et al. |
| 2020/0143481 A1 | 5/2020 | Brown et al. |
| 2020/0143843 A1 | 5/2020 | Luo et al. |
| 2020/0274962 A1* | 8/2020 | Martin .................. H04W 4/02 |

FOREIGN PATENT DOCUMENTS

| | | |
|---|---|---|
| JP | 2009-200942 A | 9/2009 |
| JP | 2010-044661 A | 2/2010 |
| JP | 2016-151986 A | 8/2016 |
| JP | 2019-179313 A | 10/2019 |
| KR | 2019-0078687 A | 7/2019 |

OTHER PUBLICATIONS

U.S. Notice of Allowance for U.S. Appl. No. 18/238,870, mailed on Aug. 1, 2024.
U.S. Office Action for U.S. Appl. No. 17/548,875, mailed on Apr. 5, 2024.
Kitahara Yumiko, "Notification Processing Apparatus", 2009 (Year: 2009), English translation of JP2009-200942A.
Yu Young Uk, "Fire Alarm System Using Artificial Intelligence", 2019 (Year: 2019), English translation of KR2019-0078687A.
Kawakami Seito, "Notification Processing System and Notification Processing Method", 2019 (Year: 2019), English translation of JP2019-179313A.
U.S. Office Action for U.S. Appl. No. 18/238,870, mailed on Apr. 5, 2024.
Huang Yan, "Based On The Flattened Command Scheduling Method And System Based On GIS", 2020 (Year: 2020), English translation of CN111199623A.
U.S. Notice of Allowance for U.S. Appl. No. 17/548,875, mailed on Aug. 1, 2024.
JP Office Action for JP Application No. 2020-216117, mailed on Oct. 22, 2024 with English Translation.

* cited by examiner

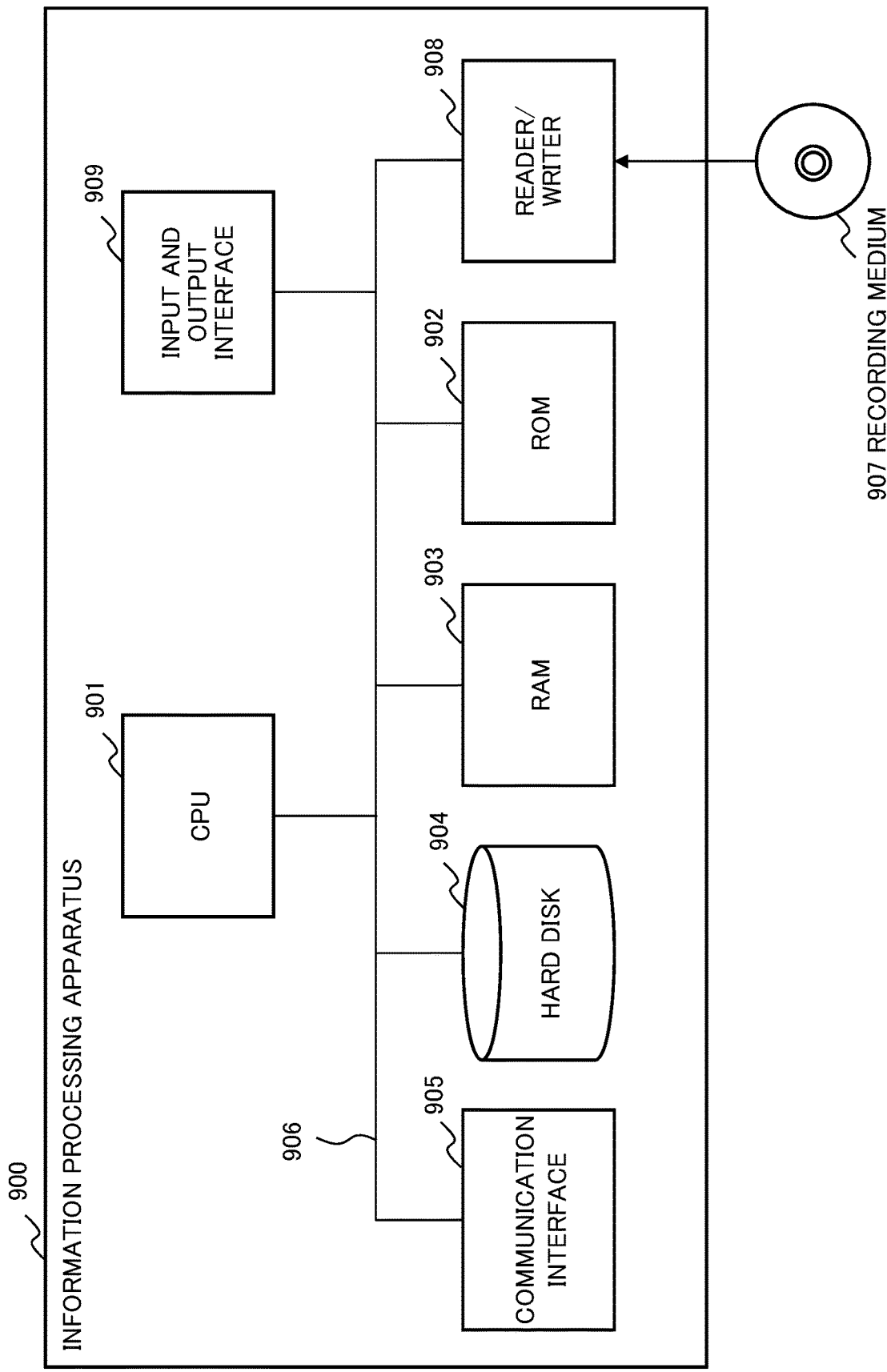

INFORMATION ACQUISITION SUPPORT APPARATUS, INFORMATION ACQUISITION SUPPORT METHOD, AND RECORDING MEDIUM STORING INFORMATION ACQUISITION SUPPORT PROGRAM

This application is a Continuation of U.S. application Ser. No. 17/548,875, filed on Dec. 13, 2021, which is based upon and claims the benefit of priority from Japanese Patent Application No. 2020-216117, filed on Dec. 25, 2020, the disclosure of which is incorporated herein in its entirety by reference.

TECHNICAL FIELD

The present invention relates to an information acquisition support apparatus, an information acquisition support method, and an information acquisition support program.

BACKGROUND ART

When an event such as a disaster, an accident, or an incident occurs, a command center such as a fire department or a police station that commands a response to the event receives a notification regarding the event, grasps a state of an occurrence site of the event on the basis of information indicated by the notification, and responds to the event. Since the number of notifications received by the command center may be large in some cases, it takes time to organize pieces of information represented by the large number of notifications, which causes a delay in responding to the event. Therefore, a technology for supporting organization of pieces of information represented by a large number of notifications has been expected.

As a technology related to such a technology, PTL 1 (JP 2019-179313 A) discloses a system in which, when a plurality of notifications are made by notifiers, a control center receives the notifications and performs identification determination of an incident (event) to identify overlapping in the notifications. With respect to this identification determination, the system determines whether a newly received notification is a notification caused by the same incident as that of the already received notification from a correlation of a position of a notifier, a notification time, and a notification type. The control center in this system specifies a responder who handles the incident on the basis of the result of the identification determination, and gives a handling notification to the specified responder.

SUMMARY

A main object of the present invention is to provide an information acquisition support apparatus and the like that support rapid and accurate grasping of a state of a site where an event is occurring.

An information acquisition support apparatus according to an aspect of the present invention includes: an acquisition means configured to acquire a plurality of first notifications regarding a first event; an analysis means configured to analyze the plurality of first notifications based on an analysis criterion; and an event state generation means configured to generate event state information obtained by integrating information indicated by the plurality of first notifications based on an analysis result of the plurality of first notifications and an information integration criterion.

In another aspect of achieving the above object, an information acquisition support method according to an aspect of the present invention includes, by an information processing apparatus, acquiring a plurality of first notifications regarding a first event, analyzing the plurality of first notifications based on an analysis criterion, and generating event state information obtained by integrating information indicated by the plurality of first notifications based on an analysis result of the plurality of first notifications and an information integration criterion.

From a further another aspect of achieving the above object, an information acquisition support program according to an aspect of the present invention causes a computer to perform: acquisition processing of acquiring a plurality of first notifications regarding a first event; an analysis processing of analyzing the plurality of first notifications based on an analysis criterion; and event state generation processing of generating event state information obtained by integrating information indicated by the plurality of first notifications based on an analysis result of the plurality of first notifications and an information integration criterion.

The present invention can also be implemented by a non-volatile computer-readable recording medium storing the information acquisition support program (computer program).

BRIEF DESCRIPTION OF THE DRAWINGS

FIG. 5 is a block diagram illustrating a configuration of an information processing apparatus capable of achieving the information acquisition support apparatus according to each example embodiment of the present invention.

EXAMPLE EMBODIMENT

An example embodiment of the present invention will be described in detail below with reference to the drawings.

FIRST EXAMPLE EMBODIMENT

Figure 1:
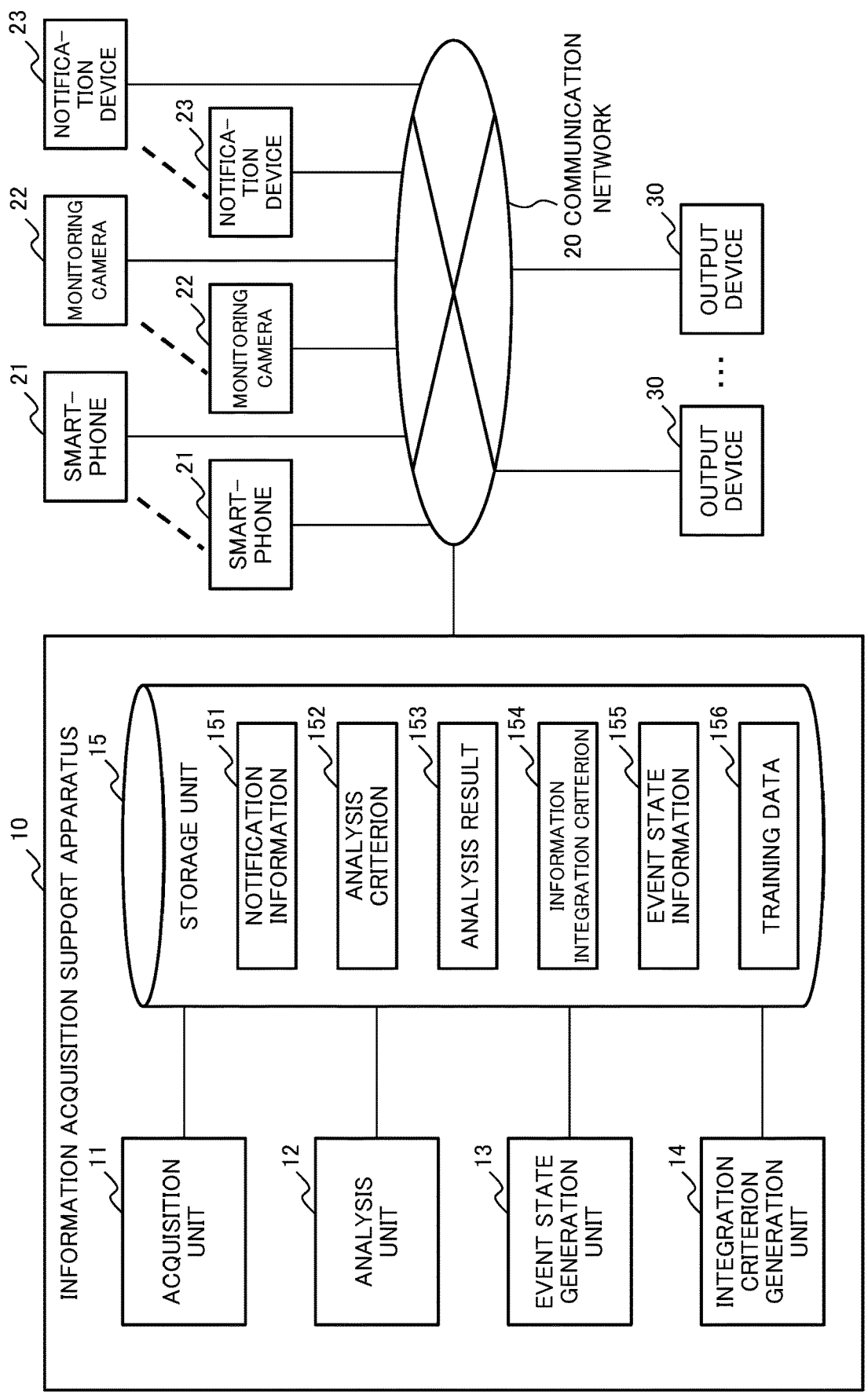
FIG. 1 is a block diagram illustrating a configuration of an information acquisition support apparatus according to a first example embodiment of the present invention.

FIG. 1 is a block diagram illustrating a configuration of an information acquisition support apparatus 10 according to a first example embodiment of the present invention. The information acquisition support apparatus 10 is an apparatus that receives a large number of notifications regarding an event such as a disaster (including a natural disaster and a human disaster), an accident, and an incident, integrates (aggregates) information represented by the notifications, and presents the integrated information to a command center such as a fire department or a police station that commands a response to the event, a person related to a local government, general public, or the like.

The information acquisition support apparatus 10 is communicably connected to one or more smartphones 21, one or more monitoring cameras 22, one or more notification devices 23, and one or more output devices 30 via a communication network 20. The communication network 20 is, for example, the Internet, a communication network constituting a telephone line, or the like.

The information acquisition support apparatus 10 includes an acquisition unit 11, an analysis unit 12, an event state generation unit 13, an integration criterion generation unit 14, and a storage unit 15. The acquisition unit 11, the analysis unit 12, the event state generation unit 13, and the integration criterion generation unit 14 are examples of an acquisition means, an analysis means, an event state generation means, and an integration criterion generation means in order.

The storage unit 15 is, for example, a storage device such as a random access memory (RAM) or a hard disk 904 described later with reference to FIG. 5. The storage unit 15 stores notification information 151, an analysis criterion 152, an analysis result 153, an information integration criterion 154, event state information 155, and training data 156. Details of these pieces of information stored in the storage unit 15 will be described later.

The acquisition unit 11 acquires a plurality of notifications (first notifications) regarding an occurred event via the communication network 20. The acquisition unit 11 acquires, for example, information regarding the event transmitted by a person who has watched the occurrence of the event, via the smartphone 21. The transmitted information includes, for example, information (captured image, text document, or the like) posted to a social networking service (SNS), an electronic mail transmitted to a command center, dial 110 or 119 notification regarding the event, or notification via the Net 119 emergency report system. The Net 119 emergency report system is a system provided by the Fire and Disaster Management Agency in Japan.

The acquisition unit 11 acquires, for example, a captured image of the event by the monitoring camera 22 installed in the vicinity of the location where the event has occurred. The acquisition unit 11 may acquire a captured image by the monitoring camera 22 at any time regardless of occurrence of an event.

The acquisition unit 11 acquires, for example, a notification made by a person who has watched the occurrence of the event using the notification device 23. The notification device 23 is, for example, a last-minute notification device installed in a fire department or a branch station thereof.

The transmission source of the notification acquired by the acquisition unit 11 is not limited to the smartphone 21, the monitoring camera 22, and the notification device 23 described above. The acquisition unit 11 may acquire a notification regarding the occurred event from a device different from the smartphone 21, the monitoring camera 22, and the notification device 23.

The acquisition unit 11 stores the notification information 151 representing the notification acquired as described above in the storage unit 15. It is assumed that the notification information 151 includes at least one of a time when each notification is made and a location of transmission of each notification.

The analysis unit 12 analyzes the notification information 151 stored in storage unit 15 by the acquisition unit 11 on the basis of the analysis criterion 152. It is assumed that the analysis criterion 152 is given in advance to the information acquisition support apparatus 10 by the user, for example. For example, in a case where the notification represented by the notification information 151 includes the voice of the notifier, the analysis unit 12 converts the voice of the notifier into a text document using an existing voice recognition technology on the basis of the criterion used for voice recognition indicated by the analysis criterion 152. The analysis unit 12 performs syntax analysis on the generated text document by using an existing syntax analysis technology on the basis of the criterion used for syntax analysis indicated by the analysis criterion 152. For example, in a case where the notification represented by the notification information 151 is information represented by a text document such as an electronic mail, the analysis unit 12 performs syntax analysis for the text document.

By performing the above-described syntax analysis, the analysis unit 12 extracts a word/phrase indicating the time or location included in the notification represented by the notification information 151, for example, and specifies the occurrence time or location of the event. In a case where the notification information 151 is, for example, information posted to an SNS, an electronic mail, or the like, the analysis unit 12 may extract information representing a transmission time or a transmission location of the notification included in the information. However, in this case, the analysis criterion 152 includes a criterion necessary for extracting information representing a transmission time or a transmission location of the notification from information posted on the SNS, an electronic mail, or the like.

By performing the above-described syntax analysis, the analysis unit 12 extracts, for example, a word/phrase (keyword) indicating an occurrence state of an event included in the notification represented by the notification information 151, and analyzes the occurrence state of the event. The analysis unit 12 analyzes the number of victims of the event by extracting words/phrases indicating the number of people, such as "3" and "5", from the notification. The analysis unit 12 analyzes the occurrence scale of the event by extracting, from the notification, words/phrases indicating the scale of a fire, a traffic accident, or the like, such as "two houses" or "four vehicles".

For example, when the notification represented by the notification information 151 includes a captured image by the smartphone 21 or the monitoring camera 22, the analysis unit 12 analyzes the captured image using an existing image recognition technology on the basis of the criterion used for image recognition indicated by the analysis criterion 152. For example, the analysis unit 12 detects flame or smoke generated from the house from the captured image, thereby determining that the notification event is a fire and analyzing the occurrence state of the fire. Alternatively, for example, the analysis unit 12 detects a plurality of vehicles damaged by a collision from the captured image, thereby determining that the notified event is a traffic accident and analyzing the occurrence state of the traffic accident.

The analysis unit 12 stores, in the storage unit 15, the analysis result 153 representing the state of the event obtained by analyzing the state of the event, which is meant by the data such as the text, the voice, and the image included in the notification information 151, on the basis of the analysis criterion 152 as described above.

The event state generation unit 13 generates the event state information 155 obtained by integrating (aggregating) the information indicated by the plurality of notifications on the basis of the analysis result 153 generated by the analysis unit 12 as described above and the information integration criterion 154. However, the information integration criterion 154 is a criterion indicating, for example, deletion of overlapping and execution of predetermined statistical processing on quantifiable information in the notification information 151. The information integration criterion 154 may be given in advance to the information acquisition support apparatus 10 by the user, for example, or may be generated or updated by an integration criterion generation unit 14 to be described later.

For example, with respect to a plurality of notifications represented by the notification information 151, the event state generation unit 13 associates a plurality of notifications having the same or similar transmission time and transmission location with the same event, and integrates information indicated by the plurality of notifications associated with the same event. However, in the present example embodiment, "integrate" means, for example, deleting a portion where overlapping contents in information and performing predetermined statistical processing (for example, obtaining an average value, an intermediate value, or the like) on quantifiable information. In the present example embodiment, "integrate" may be referred to as "aggregate" or "organize".

In a case where a plurality of notifications associated with the same event indicates, for example, a fire of three adjacent houses, the event state generation unit 13 integrates overlapping information indicating a fire of three houses into one event state information 155.

In a case where a plurality of values of the number of houses in which a fire has occurred are mixed in a plurality of notifications associated with the same event, for example, the event state generation unit 13 performs predetermined statistical processing on the plurality of values and integrates the number of houses in which the fire has occurred into a value of a result of the statistical processing. For example, in a case where a plurality of notifications associated with the same fire indicates a fire of three to five houses, the event state generation unit 13 integrates the number of houses where the fire has occurred into, for example, five houses, which is the maximum value thereof. In this case, when a plurality of numerical values related to the occurrence scale of the event is included in a plurality of notifications, the information integration criterion 154 indicates that the occurrence scale of the event is integrated into the maximum value of the plurality of numerical values. This is based on a policy of recognizing the occurrence state of the event as bad as possible so as to enable a steady response to the event.

The information integration criterion 154 is not limited to the criterion based on the policy described above. For example, when a plurality of numerical values related to the occurrence scale of the event is included in a plurality of notifications, the information integration criterion 154 may indicate that the occurrence scale of the event is integrated into the average value of the plurality of numerical values. Alternatively, for example, when there is a numerical value greatly deviating from other numerical values among a plurality of numerical values related to the occurrence scale of the event, the information integration criterion 154 may indicate that the greatly deviating numerical value is ignored.

The event state generation unit 13 stores the event state information 155 generated as described above on the basis of the analysis result 153 and the information integration criterion 154 in the storage unit 15. Then, the event state generation unit 13 displays the generated event state information 155 on the display screen of the output device 30.

Figure 2:
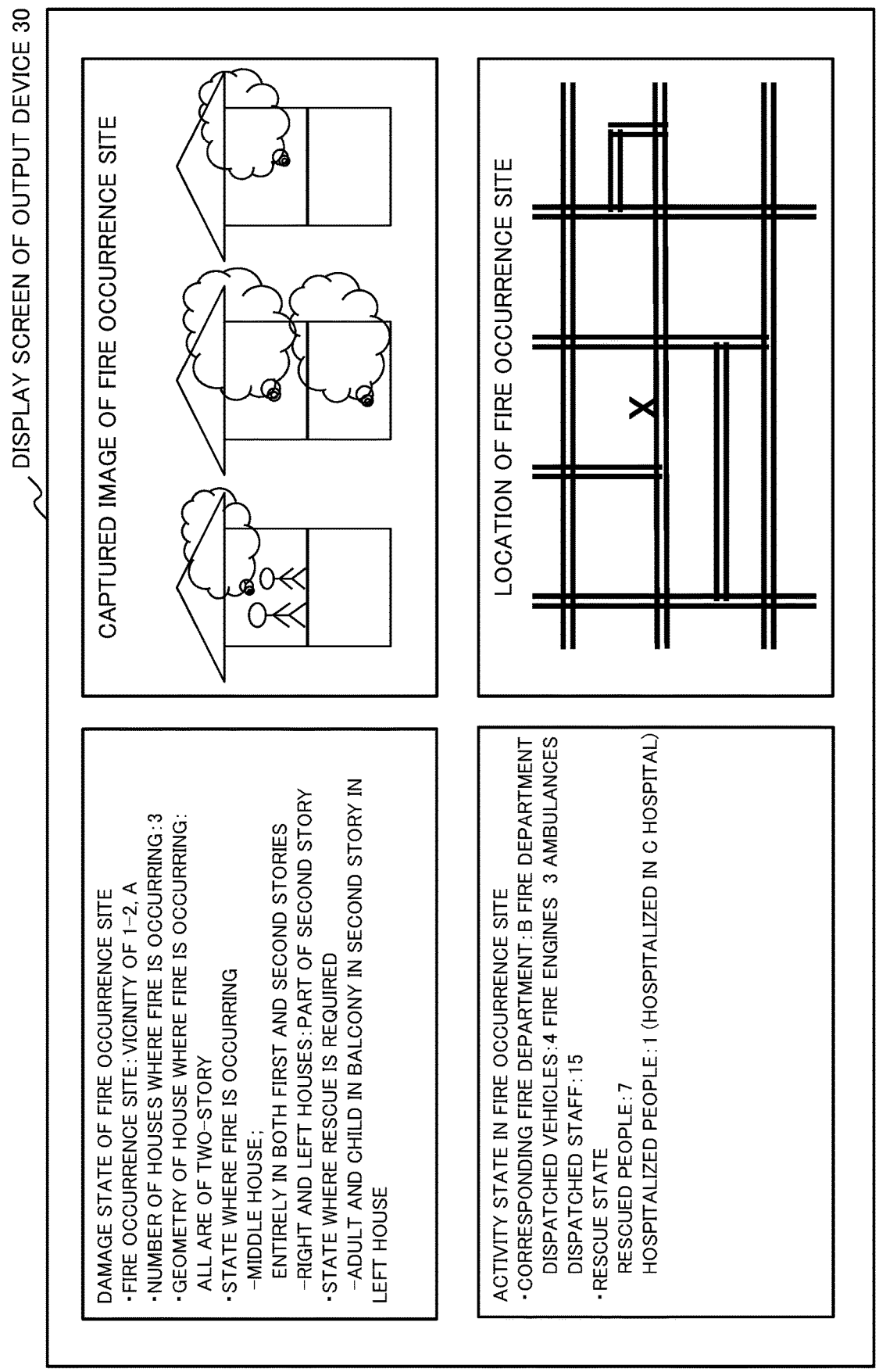
FIG. 2 is a diagram illustrating a mode in which the information acquisition support apparatus according to the first example embodiment of the present invention displays event state information on a display screen of an output device.

FIG. 2 is a diagram illustrating a mode in which the information acquisition support apparatus 10 according to the present example embodiment displays the generated event state information 155 on a display screen of the output device 30. In the example illustrated in FIG. 2, the event state generation unit 13 displays the damage state of the fire occurrence site, the activity state in the fire occurrence site, the captured image of the fire occurrence site, and the location of the fire occurrence site represented by the event state information 155.

The damage state of the fire occurrence site illustrated in FIG. 2 represents information in which information represented by a plurality of notifications is integrated by the event state generation unit 13 with respect to a fire occurrence location (address), the number of houses where fire is occurring, a geometry of the house where fire is occurring, a state where fire is occurring, and a state where rescue is required. The damage state of the fire occurrence site illustrated in FIG. 2 represents information obtained by integrating information represented by a notification from a fire department regarding the fire department dispatched for the fire and the rescue state.

The captured image of the fire occurrence site illustrated in FIG. 2 is a still image or a moving image clearly representing the state of the fire occurrence site captured by the smartphone 21, the monitoring camera 22, or the like. The event state generation unit 13 selects and displays the captured image matching the organized state of the fire occurrence site on the basis of the analysis result of the captured image indicated by the analysis result 153. For example, the event state generation unit 13 may display a plurality of captured images side by side on the display screen of the output device 30. Alternatively, for example, the event state generation unit 13 may display a real-time captured image transmitted from the smartphone 21, the monitoring camera 22, or the like on the display screen of the output device 30.

The location of the fire occurrence site illustrated in FIG. 2 is information indicating the location of the fire occurrence site on a map. However, it is assumed that map information of the surrounding area of the fire occurrence site is given to the information acquisition support apparatus 10.

The mode in which the event state generation unit 13 displays the event state information 155 on the display screen of the output device 30 is not limited to the mode illustrated in FIG. 2, and the event state generation unit 13 may display the event state information 155 on the display screen of the output device 30 in a mode different from that in FIG. 2. The event state generation unit 13 may change the mode of the event state information 155 according to the presentation destination of the event state information 155, and display the event state information 155 having a different mode for each presentation destination on the display screen of the output device 30 that presents the event state information 155 to the presentation destination. However, the criterion for changing the mode of the event state information 155 for each presentation destination are included in the information integration criterion 154.

For example, the activity state in the fire occurrence site illustrated in FIG. 2 is information to be grasped by the command center. Therefore, the event state generation unit 13 may display the activity state in the fire occurrence site on the display screen of the output device 30 for the command center, but may not display the activity state in the fire occurrence site on the display screen of the output device 30 for general public. Alternatively, for example, the event state generation unit 13 may display even the captured image of the site with strong stimulation (the devastation of the site can be clearly grasped) on the display screen of the output device 30 for the command center, but may not display the captured image of the site with strong stimulation on the display screen of the output device 30 for general public.

The integration criterion generation unit 14 illustrated in FIG. 1 generates or updates the information integration criterion 154 by performing machine learning such as deep learning by artificial intelligence configured by, for example, a neural network or the like on the relationship between the analysis result 153 and the event state information 155 using the training data 156. However, the training data 156 is information in which analysis results for a plurality of notifications (second notifications) related to an event (second event) that has occurred in the past are associated with results of occurrence state of the event. It is assumed that the training data 156 is given in advance to the information acquisition support apparatus 10 by the user, for example.

Figure 3:
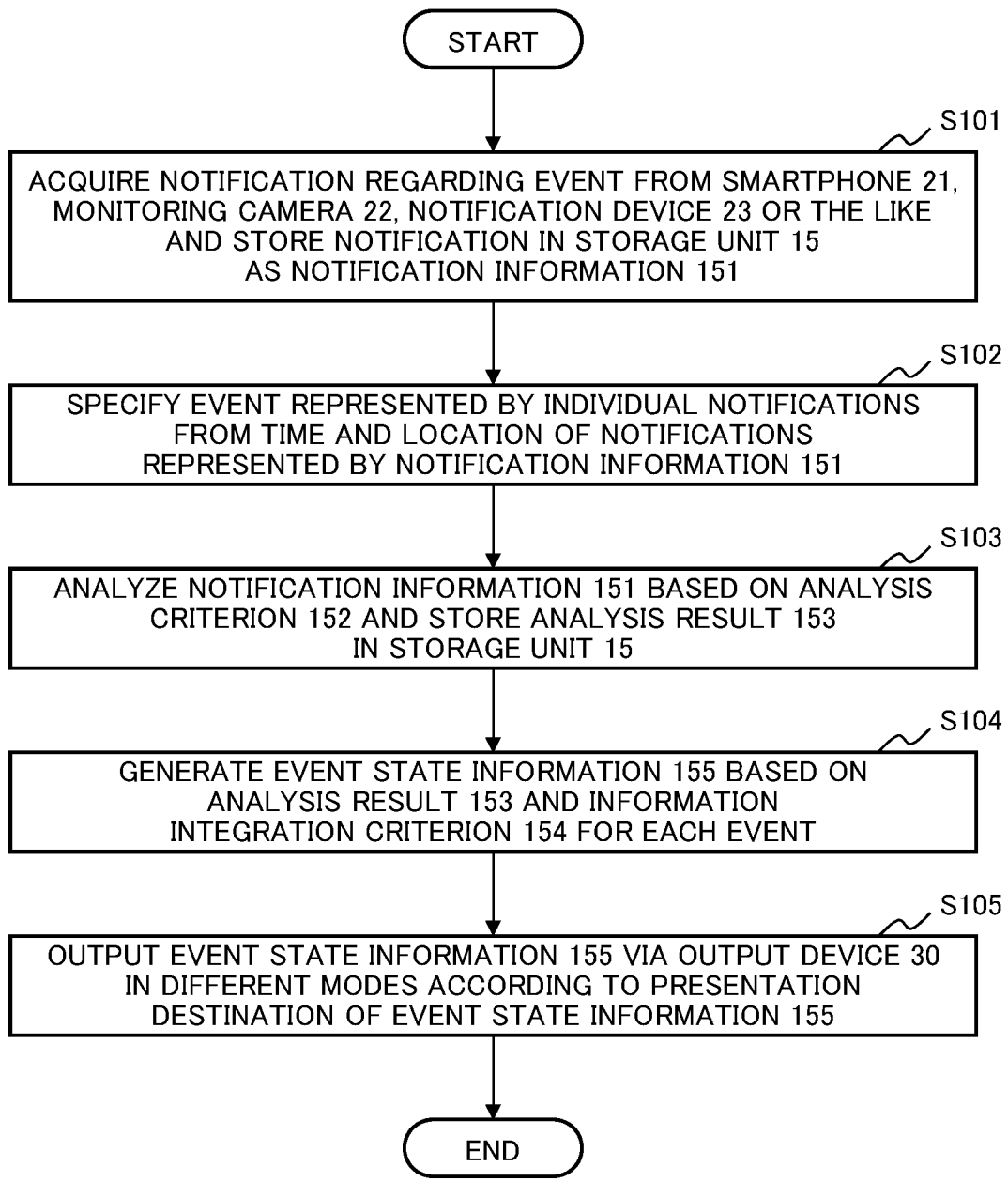
FIG. 3 is a flowchart illustrating operation of the information acquisition support apparatus according to the first example embodiment of the present invention.

Next, the operation (processing) of the information acquisition support apparatus according to the present example embodiment will be described in detail with reference to the flowchart of FIG. 3.

The acquisition unit 11 acquires a notification regarding an event from the smartphone 21, the monitoring camera 22, the notification device 23, or the like, and stores the notification in the storage unit 15 as the notification information 151 (step S101). The analysis unit 12 specifies the event represented by each notification from the time and location at which the notification is made represented by the notification information 151 (step S102). The analysis unit 12 analyzes the notification information 151 related to each event on the basis of the analysis criterion 152 and stores the analysis result 153 in the storage unit 15 (step S103).

The event state generation unit 13 generates the event state information 155 in which the state of the event occurrence site is organized for each event on the basis of the analysis result 153 and the information integration criterion 154 (step S104). The event state generation unit 13 outputs the generated event state information 155 via the output device 30 in a different mode according to the presentation destination of the event state information 155 (step S105), and the entire processing is terminated.

The information acquisition support apparatus 10 according to the present example embodiment can support rapid and accurate grasping of a state of a site where an event is occurring. This is because the information acquisition support apparatus 10 analyzes a plurality of notifications regarding an event on the basis of the analysis criterion 152, and generates the event state information 155 in which information indicated by the plurality of notifications is integrated on the basis of the analysis result 153 and the information integration criterion 154.

Effects achieved by the information acquisition support apparatus 10 according to the present example embodiment will be described in detail below.

In a case where a command center corresponding to an event such as a disaster or an accident receives a large number of notifications, for example, even if the notifications are related to the same event, there is a case where the contents of the state of the occurrence site of the event indicated by the plurality of notifications do not coincide or contradict each other due to a difference in time and location at which the notifiers have watched the event or how the notifiers perceive the event. In such a case, the command center cannot quickly and accurately grasp the state of the site where the event is occurring, which causes a delay in appropriate response to the event. That is, it is a problem to support rapid and accurate grasping of a state of a site where an event is occurring.

In order to solve such a problem, the information acquisition support apparatus according to the present example embodiment includes the acquisition unit 11, the analysis unit 12, and the event state generation unit 13, and operates as described above with reference to FIGS. 1 to 3, for example. That is, the acquisition unit 11 acquires the notification information 151 representing a plurality of notifications (first notifications) related to an event (first event). The analysis unit 12 analyzes the notification information 151 on the basis of the analysis criterion 152. The event state generation unit 13 generates the event state information 155 obtained by integrating (aggregating) the information indicated by the plurality of notifications on the basis of the analysis result 153 with respect to the notification information 151 and the information integration criterion 154.

That is, the information acquisition support apparatus 10 according to the present example embodiment integrates (aggregates) the contents of a plurality of notifications including overlapping or contradictory contents regarding the state of the event occurrence site. As a result, the information acquisition support apparatus 10 according to the present embodiment can support rapid and accurate grasping of a state of a site where an event is occurring.

The information acquisition support apparatus 10 according to the present example embodiment generates or updates the information integration criterion 154 by performing machine learning on a relationship between an analysis result of a plurality of notifications (second notifications) related to an event (second event) that has occurred in the past and results of occurrence states of the event. As a result, the information acquisition support apparatus 10 can gradually increase the accuracy of the information integration criterion 154, and thus, can increase the accuracy of the event state information 155 to be generated.

The information acquisition support apparatus 10 according to the present example embodiment changes the mode of the event state information 155 according to the presentation destination (command center, local government, general public, or the like) of the generated event state information 155, and outputs the event state information 155 having a different mode for each presentation destination via the output device 30. As a result, the information acquisition support apparatus 10 can avoid, for example, presenting information inappropriate or unnecessary for a certain presentation destination to the presentation destination.

The information acquisition support apparatus 10 according to the present example embodiment acquires a notification via a telephone, an electronic mail, or an information transmission to an SNS via the smartphone 21, a captured image by the monitoring camera 22, or a notification via the notification device 23 installed at a predetermined location. As described above, since the information acquisition support apparatus 10 integrates notifications acquired via various routes, that is, notifications including a large amount of information related to the occurred event, it is possible to generate more accurate event state information 155.

The events targeted by the notification acquired by the information acquisition support apparatus 10 according to the present example embodiment are not limited to the above-described disasters (including natural disasters and human disasters), accidents, incidents, and the like. The targets of the information acquisition support apparatus 10 may include, for example, a notification regarding a lost article in a transportation facility, a notification to a hospital when a person who gets sick is seen, or the like.

SECOND EXAMPLE EMBODIMENT

Figure 4:
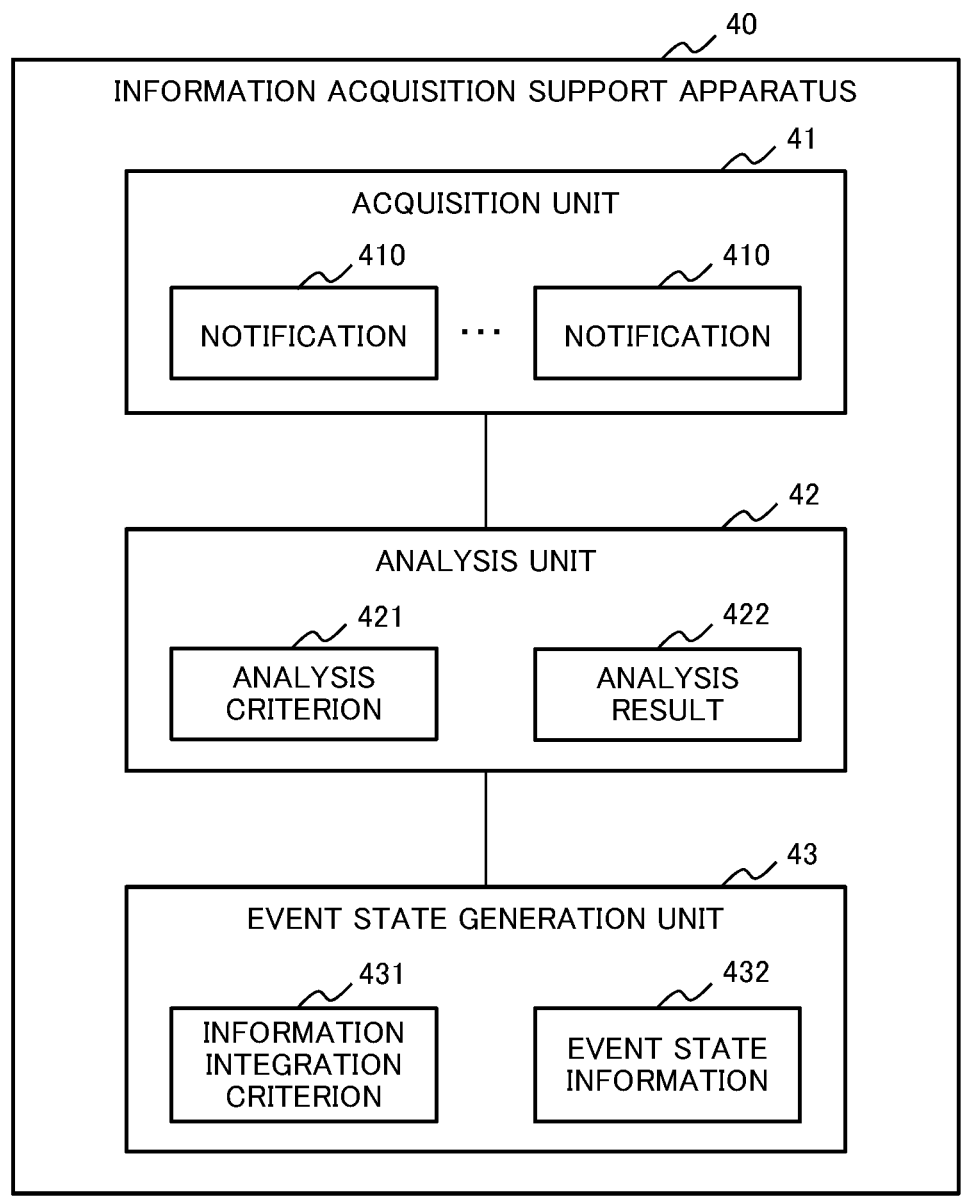
FIG. 4 is a block diagram illustrating a configuration of an information acquisition support apparatus according to a second example embodiment of the present invention.

FIG. 4 is a block diagram illustrating a configuration of an information acquisition support apparatus 40 according to a second example embodiment of the present invention.

The information acquisition support apparatus 40 according to the present example embodiment includes an acquisition unit 41, an analysis unit 42, and an event state generation unit 43. The acquisition unit 41, the analysis unit 42, and the event state generation unit 43 are examples of an acquisition means, an analysis means, and an event state generation means in order.

The acquisition unit 41 acquires a plurality of notifications 410 (first notifications) related to an event (first event). For example, as similar to the acquisition unit 11 according to the first example embodiment, the acquisition unit 41 may acquire the notification 410 from devices such as the smartphone 21, the monitoring camera 22, and the notification device 23. The plurality of notifications 410 is, for example, information similar to the notification information 151 according to the first example embodiment.

The analysis unit 42 analyzes the plurality of notifications 410 on the basis of the analysis criterion 421. The analysis criterion 421 is, for example, a criterion similar to the analysis criterion 152 according to the first example embodiment. The analysis unit 42 operates similarly to the analysis unit 12 according to the first example embodiment, for example, to generate the analysis result 422. The analysis result 422 is, for example, information similar to the analysis result 153 according to the first example embodiment.

The event state generation unit 43 generates the event state information 432 obtained by integrating the information indicated by the plurality of notifications 410 on the basis of the analysis result 422 for the plurality of notifications 410 and the information integration criterion 431. The information integration criterion 431 is, for example, a criterion similar to the information integration criterion 154 according to the first example embodiment. The event state generation unit 43 operates similarly to the event state generation unit 13 according to the first example embodiment, for example, to generate the event state information 432. The event state information 432 is, for example, information similar to the event state information 155 according to the first example embodiment.

The information acquisition support apparatus 40 according to the present example embodiment can support rapid and accurate grasping of a state of a site where an event is occurring. This is because the information acquisition support apparatus 40 analyzes a plurality of notifications regarding an event on the basis of the analysis criterion 421, and generates the event state information 432 in which information indicated by the plurality of notifications 410 is integrated on the basis of the analysis result 422 and the information integration criterion 431.

Hardware Configuration Example

Each unit in the information acquisition support apparatus illustrated in FIGS. 1 and 4 in each of the above-described example embodiments can be achieved by dedicated hardware (HW) (electronic circuit). In FIGS. 1 and 4, at least the following configuration can be regarded as a function (processing) unit (software module) of a software program including an instruction executed by a processor.

The acquisition units 11 and 41,
the analysis units 12 and 42,
the event state generation units 13 and 43,
the integration criterion generation unit 14, and
the storage control function in the storage unit 15.

However, the division of each unit illustrated in these drawings is a configuration for convenience of description, and various configurations can be assumed at the time of implementation. An example of a hardware environment in this case will be described with reference to FIG. 5.

FIG. 5 is a diagram exemplarily describing a configuration of an information processing apparatus 900 (computer) capable of achieving the information acquisition support apparatus according to each example embodiment of the present invention. That is, FIG. 5 represents a configuration of a computer (information processing apparatus) capable of achieving the information acquisition support apparatus illustrated in FIGS. 1 and 4, and a hardware environment capable of achieving each function in the above-described example embodiments.

The information processing apparatus 900 illustrated in FIG. 5 includes the following components as components.
 a central processing unit (CPU) 901,
 a read only memory (ROM) 902,
 a random access memory (RAM) 903,
 a hard disk (storage device) 904,
 a communication interface 905,
 a bus 906 (communication line),
 a reader/writer 908 capable of reading and writing data stored in a recording medium 907 such as a compact disc read only memory (CD-ROM), and
 an input and output interface 909 such as a monitor, a speaker, or a keyboard.

That is, the information processing apparatus 900 including the above-described components is a general computer to which these components are connected via the bus 906. The information processing apparatus 900 may include a plurality of CPUs 901 or may include a CPU 901 configured by multiple cores.

In the above-described example embodiments, a computer program capable of achieving the following functions may be supplied to the information processing apparatus 900 illustrated in FIG. 5. For example, the function is the above-described configuration in the block configuration diagram (FIGS. 1 and 4) referred to in the description of the example embodiments or the function in the flowchart (FIG. 3). Thereafter, the function of the information acquisition support apparatus according to the present example embodiment is achieved by reading the computer program to the CPU 901 of the hardware and interpreting and executing the computer program. The computer program supplied into the apparatus may be stored in a readable/writable volatile memory (RAM 903) or a nonvolatile storage device such as the ROM 902 or the hard disk 904.

In the above case, a general procedure can be adopted at present as a method of supplying the computer program into the hardware. Examples of the procedure include a method of installing the program in the apparatus via various recording media 907 such as a CD-ROM, a method of downloading the program from the outside via a communication line such as the Internet, and the like. In such a case, the computer program supplied to the information processing apparatus according to the present example embodiment can be regarded as being configured by a code constituting the program or the recording medium 907 storing the code.

The present invention has been described above using the above-described example embodiments as exemplary examples. However, the present invention is not limited to the above-described example embodiments. That is, various aspects that can be understood by those skilled in the art can be applied to the example embodiments in the present invention within the scope of the present invention.

The invention claimed is:

1. An information acquisition support apparatus comprising: at least one memory storing a computer program; and at least one processor configured to execute the computer program to acquire notifications regarding an event, analyze the notifications based on an analysis criterion, determine which information among plural kinds of event state information representing an analysis result of the notifications to display on a display screen based on a presentation destination of the display screen, and display the determined information among the plural kinds of event state information side by side on the display screen, wherein the plural kinds of the event state information include all of a damage state of an event occurrence site, an activity state of the event occurrence site, a captured image of the event occurrence site, and a location of the event occurrence site;

wherein the at least one processor is further configured to:

in a case of the presentation destination of the display screen being a command center, control the display screen to display the damage state of the event occurrence site, the activity state of the event occurrence site, the captured image of the event occurrence site, and the location of the event occurrence site; and in a case of the presentation destination of the display screen being a general public, control the display screen to display the damage state of the event occurrence site and the location of the event occurrence site.

2. The information acquisition support apparatus according to: The information acquisition support apparatus according to wherein the event is fire, and wherein the damage state of the event occurrence site includes at least any one of a fire occurrence location, a number of houses where the fire is occurring, a state where the fire in occurring, and a state where rescue is required.

3. The information acquisition support apparatus according to: The information acquisition support apparatus according to wherein the event is fire, and wherein the activity state of the event occurrence site includes at least either a fire department dispatched for the fire or rescue state.

4. The information acquisition support apparatus according to claim 1, wherein the captured image of the event occurrence site includes s still image or a moving image representing a state of the event occurrence site captured by a smartphone or a monitoring camera.

5. The information acquisition support apparatus according to claim 4, wherein the processor is configured to execute the computer program to display a real-time captured image transmitted from the smartphone or the monitoring camera.

6. The information acquisition support apparatus according to claim 1, wherein the processor is configured to execute the computer program to select the captured image matching the damage state of the event occurrence site.

7. The information acquisition support apparatus according to claim 1, wherein the processor is configured to execute the computer program to display plural captured images on the event occurrence site side by side on the display screen.

8. The information acquisition support apparatus according to claim 1, wherein the location of the event occurrence site is indicated on a map of surrounding area of the event occurrence site.

9. An information acquisition support method by an information processing apparatus, the method comprising:
acquiring notifications regarding an event;
analyzing the notifications based on an analysis criterion;
determining which information among plural kinds of event state information representing an analysis result of the notifications to display on a display screen based on a presentation destination of the display screen, and displaying the determined information among the plural kinds of event state information side by side on the display screen, wherein the plural kinds of the event state information include all of a damage state of an event occurrence site, an activity state of the event occurrence site, a captured image of the event occurrence site, and a location of the event occurrence site;

wherein in a case of the presentation destination of the display screen being a command center, control the display screen to display the damage state of the event occurrence site, the activity state of the event occurrence site, the captured image of the event occurrence site, and the location of the event occurrence site; and in a case of the presentation destination of the display screen being a general public, control the display screen to display the damage state of the event occurrence site and the location of the event occurrence site.

10. The information acquisition support method according to: The information acquisition support method according to wherein the event is fire, and wherein the damage state of the event occurrence site includes at least any one of a fire occurrence location, a number of houses where the fire is occurring, a state where the fire in occurring, and a state where rescue is required.

11. The information acquisition support method according to: The information acquisition support method according to wherein the event is fire, and wherein the activity state of the event occurrence site includes at least either a fire department dispatched for the fire or rescue state.

12. The information acquisition support method according to claim 9, wherein the captured image of the event occurrence site includes s still image or a moving image representing a state of the event occurrence site captured by a smartphone or a monitoring camera.

13. The information acquisition support method according to claim 12, further comprising: displaying a real-time captured image transmitted from the smartphone or the monitoring camera.

14. The information acquisition support method according to claim 9, further comprising: selecting the captured image matching the damage state of the event occurrence site.

15. The information acquisition support method according to claim 9, further comprising: displaying plural captured images on the event occurrence site side by side on the display screen.

16. The information acquisition support method according to claim 9, wherein the location of the event occurence site is in indicated on a map of surrounding area of the event occurrence site.

17. A non-transitory computer-readable recording medium storing an information acquisition support program for causing a computerto perform:
acquiring notifications regarding an event,
analyzing the notifications based on an analysis criterion, determining which information among plural kinds of event state information representing an analysis result of the notifications to display on a display screen based on a presentation destination of the display screen, and
displaying the determined information among the plural kinds of event state information side by side on the display screen, wherein the plural kinds of the event state information include all of a damage state of an event occurrence site, an activity state of the event occurrence site, a captured image of the event occurrence site, and a location of the event occurrence site;

wherein in a case of the presentation destination of the display screen being a command center, control the display screen to display the damage state of the event occurrence site, the activity state of the event occurrence site, the captured image of the event occurrence site, and the location of the event occurrence site; and in a case of the presentation destination of the display screen being a general public, control the display screen to display the damage state of the event occurrence site and the location of the event occurrence site.

* * * * *